United States Patent Office 2,967,828
Patented Jan. 10, 1961

2,967,828

SILICEOUS AMINO COMPOUNDS AND LUBRICATING GREASE CONTAINING SAME

Frederick J. Ihde, Jr., Mountain Lakes, N.J., assignor to Nopco Chemical Company, Harrison, N.J., a corporation of New Jersey No Drawing. Filed Sept. 13, 1955, Ser. No. 534,162

31 Claims. (Cl. 252—49.7)

This invention relates to a new class of amino compounds. More particularly, the invention relates to a class of siliceous amino compounds which have novel and outstanding gel-forming characteristics. The invention relates also to the process by which such compounds are produced. It further relates to the lubricating greases prepared using the novel compounds.

Water-soluble soaps of water-insoluble fatty acids and water-insoluble metal soaps of water-insoluble fatty acids are the bodying agents principally employed in the commercial production of lubricating greases. In recent years, however, increased interest has been shown in greases produced using inorganic colloidal materials as the bodying agents, as, for example, in greases made from silica hydrogels. Many highly desirable properties have been attributed to such greases. The most noteworthy of these include the relatively high melting points of the greases, the superior thermal stability of certain of the greases, the superior mechanical stability of certain of the greases and combinations of these properties. Unfortunately, however, greases produced from a majority of the inorganic colloidal materials test d exhibited certain characteristics which greatly restricted their possibilities for use. These characteristics include, among others, a tendency of the grease to break down in the presence of water or in the presence of water vapor and the inability of the grease to inhibit or retard the corrosion of metals, such as, steel, with which the grease during its use might, and often times must, come in contact. In addition to these factors, commercial development of such greases has been deterred, in part, by the fact that many of the colloidal gel-forming materials can be manufactured in bulk only either at considerable expense or with considerable technological difficulty or both.

It is the object of this invention to provide novel amino compounds.

It is a further object of this invention to provide siliceous amino compounds which are fully suited for use in the production of greases having relatively high melting points and superior stability.

A further object of the invention is to provide a commercially practical process by which the novel grease base compositions of the invention can be produced.

Other objects of the invention will be obvious and will, in part, appear hereinafter.

It has been discovered that novel amino compounds having unusual and outstanding gel-forming properties are produced when a salt of a partial amide is reacted with at least a stoichiometrically equivalent amount of a silicate salt.

As used through the present specification and in the claims the expression "partial amide" means monocarboxylic acid-polyamine reaction products containing at least one amide group and at least one primary, secondary or tertiary amino group. In general, salts produced from such partial amides are used in the process of this invention. More particularly, salts of partial amides produced by the reaction of (1) an alkylene polyamine containing two or more amino groups, such as, diethylene triamine, triethylene tetramine, tetraethylene pentamine, hexaethylene heptamine, etc., and derivatives of said polyamines having alkyl, hydroxy, alkoxy, etc. groups substituted for a hydrogen of an amino group thereof, such as, 3-dimethyl amino propylamine with (2) a compound selected from the group consisting of aliphatic monocarboxylic acylating substances having a carbon chain length of from about 6 to about 22 carbon atoms, naphthenic acid and tall oil. As used in the specification and in the claims, the expression aliphatic monocarboxylic acylating substances includes aliphatic monocarboxylic acids, whether saturated or unsaturated, hydroxylated or halogenated having a carbon chain length of from about 6 to about 22 carbon atoms and esters and acyl halides of such aliphatic monocarboxylic acids. For example, salts produced from partial amides prepared by the reaction of an alkylene polyamine, or a substituted alkylene polyamine, with an aliphatic monocarboxylic acid, such as, caproic acid, caprylic acid, capric acid, lauric acid, myristic acid, palmitic acid, stearic acid, oleic acid, linoleic acid, linolenic acid, dichlorostearic acid or hydroxy stearic acid can be employed. Moreover, salts produced from partial amides prepared by reacting an alkylene polyamine, or a substituted derivative thereof, with a glyceride, such as, tallow, soybean oil, coconut oil, cottonseed oil, palm kernel oil, castor oil and other fats and oils, either natural or hydrogenated, or with the fatty acids, or natural mixtures thereof, obtained from such glycerides, are fully suited for use. Salts produced from partial amides prepared by reacting an alkylene polyamine, or a substituted derivative thereof, with an acyl halide, such as, n-caproyl chloride, octanoyl chloride, lauroyl chloride, stearyl chloride, etc. also can be used in producing the novel products of the invention. Also, if desired, salts produced from partial amides prepared by reacting an alkylene polyamine, or a substituted derivative thereof, with naphthenic acid, tall oil, etc., can be employed. In the preferred embodiment of the invention, however, salts produced from partial amides prepared by reacting an alkylene polyamine with an aliphatic monocarboxylic acid having a carbon chain length of from about 8 to about 18 carbon atoms are employed.

The partial amide reactant is used in the practice of this invention in the form of any one of its water-soluble or water-dispersible salts. Thus, for example, organic and inorganic acid salts such as acetic acid salts, propionic acid salts, hydrochloric acid salts, phosphoric acid salts, sulfuric acid salts, etc., of the partial amides can be employed. In addition, water-soluble or water-dispersible salts of suitable partial amides produced from organic and inorganic acids other than those specifically mentioned heretofore can be used. The only limitation on the scope of the invention in this respect is that the acid used must be one which will produce a water-soluble or water-dispersible salt of the partial amide.

Neither the manufacture of the partial amide nor the production of the salt thereof is a part of the present invention. Hence, the invention is not to be construed as restricted to the use of an amide salt produced by any particular method. The methods by which the partial amides and the salts thereof can be produced are well known in the art. Products produced by any of these processes can be used in the practice of this invention.

In producing the novel products of this invention a partial amide salt is reacted with a silicate salt. The silicate salt employed can be any of the various forms of sodium silicate, potassium silicate or ammonium silicate. The only restriction on the silicate salt is that it must be water-soluble or substantially water-soluble. Thus, if desired, sodium metasilicate ($Na_2O:SiO_2$), sodium orthosilicate ($2Na_2O:SiO_2$) or any other water-soluble sodium silicate, such as, sodium silicate having the composition $Na_2O:4SiO_2$ can be used. Potassium silicate $(K_2O:SiO_2)$, potassium tetrasilicate $(K_2O:4SiO_2.H_2O)$ or any other water-soluble potassium silicate can also be employed. Moreover, any water-soluble ammonium silicate can be employed in producing the novel products of the invention. The preferred products, however, are produced by reacting the partial amide salt with sodium silicate having the composition $Na_2O:3.22SiO_2$.

The precise nature of the reaction of the silicate salt and the salt of the partial amide is not known. It is believed that the sodium, potassium or ammonium ions of the silicate form a salt with the acid radicals of the partial amide salt and that the silicate portion of the silicate salt combines with the amino nitrogen atoms of the partial amide reactant to produce the siliceous amino compound of the invention. However, since the nature of the reaction is not known the above theory should not be construed as limiting the scope of the invention.

In producing the novel compounds, the silicate salt is employed in quantities which are at least stoichiometrically equivalent to the quantity of partial amide salt with which it is to be reacted. For the purposes of this invention, a "stoichiometrically equivalent" quantity is that quantity of silicate salt which will provide sufficient sodium, potassium or ammonium ions to neutralize all of the acid radicals of the partial amide salt. The preferred products of the invention, however, are produced using quantities of silicate salt in excess of the stoichiometrically equivalent amount. Any excess silicate salt which remains free and unreacted at the conclusion of the reaction can be either removed from the reaction product with which it is admixed by washing with water or, as is the case in the preferred practice of the invention, it can be converted with acid to silicon dioxide and the water-soluble sodium, potassium or ammonium salt of the acid. As used throughout this specification the expresssion "silicon dioxide" connotes that product which is, at times, also referred to as silicic acid or hydrated silica. When, in the practice of the invention, excess silicate salt is employed, the silicon dioxide which is produced, when and if the reaction mixture is subsequently treated with acid, becomes suspended in the reaction mixture. The siliceous amino product resulting from the reaction of the silicate salt and the partial amide salt becomes adsorbed on the surface of the silicon dioxide. The water-soluble sodium, potassium or ammonium salt of the acid which is produced as the incidental reaction product of this acid-treating step dissolves in the aqueous reaction media and is removed from the water-insoluble product of the invention when the product is separated from the reaction media, as, for example, by filtration.

The silicate salt can be used in the process of this invention in such excess quantities that silicon dioxide, produced when the excess silicate salt is treated with acid, comprises up to 90% by weight and the novel siliceous amino compound 10% by weight of the final product. In general, any organic or inorganic acid which is capable of converting the unreacted silicate salt present in the reaction mixture to silicon dioxide and a readily water-soluble salt of the acid can be used in this step. Thus any aliphatic carboxylic acid which is capable of reacting with the unreacted silicate salt present to form silicon dioxide and the corresponding water-soluble salt can be employed in this step of the process. Generally, aliphatic carboxylic acids containing up to about 6 carbon atoms are most suitable. However, mineral acids are preferably employed. Thus, acids, such as, acetic acid, propionic acid, butyric acid, caproic acid, hydrochloric acid, phosphoric acid and sulfuric acid have been found to be especially well suited for use. However, it will be apparent to those skilled in the art that the invention need not be limited solely to the use of the specific acids heretofore named.

In the aforementioned acid-treating step of the process, the excess silicate salt which remains free and unreacted in the reaction mixture is treated with the theoretically equivalent quantity of acid which will react therewith to produce silicon dioxide and a water-soluble salt of the acid. It has been found that the introduction of a quantity of acid into the reaction mixture which is in excess of that theoretically required to convert all of the unreacted silicate salt present to silicon dioxide tends to break down the novel siliceous amino compounds of the invention.

The novel compounds of this invention are produced in a manner which is readily adapted to large scale commercial production methods. In carrying out the process the silicate salt is first dissolved in a solvent. Ordinarily this can be readily accomplished at a temperature ranging from room temperature up to about 80° C. In the preferred embodiment of the invention the solvent employed for the silicate salt is water. However, if desired, water mixed with any inert organic solvent can be used as the solvent for the silicate. Thus, for example, any water-miscible or water-immiscible organic solvent can be used in conjunction with water in producing the products of the invention. Thus, aliphatic monohydroxy alcohols such as methyl alcohol, ethyl alcohol, propyl alcohol, n-butyl alcohol, hexyl alcohol, heptyl alcohol, etc. or hydrocarbons such as benzene, napntha, xylene, etc., can be employed in admixture witn water. In addition to these specific solvents other such water-miscible or water-immiscible organic solvents admixed witn water may be employed. It has been found that the presence of a mixture of water and a water-immiscible organic solvent provides certain advantages over a reaction system which contains water alone or a mixture of water with a water-miscible solvent. This is attributable to the fact that the siliceous amino compositions produced in the practice of this invention possess a very high capacity for absorbing any water-immiscible organic solvent used. The absorption of the solvent by the product has been found to increase greatly the filterability of the product and, hence, to aid in its removal from the system in which it was produced. Furthermore, the use of a mixture of water and a water-immiscible solvent decreases the tendency of the product to become contaminated by tne water-soluble salts which are produced when excess silicate salt is converted to silicon dioxide with acid. Thus, since the contaminating salt dissolves in the aqueous portion of the reaction mixture and since the product of the invention absorbs the water-immiscible organic solvent, the immiscibility of the two solvents greatly lessens the opportunity for the contaminating salt and the product to come into contact. As a result, products produced in a sysem comprising a mixture of water and a water-immiscible organic solvent will be obtained almost completely free of extraneous water-soluble inorganic salts. Furthermore, as an added advantage of using such a system, it nas been found that the products produced exhibit a lesser tendency to agglomerate on drying. However, principally for economic reasons, the products of this invention are generally produced in a purely aqueous medium.

The concentration of the silicate salt solution employed in carrying out the invention can be varied within rather wide limits. Thus, for example, the process can be carried out quite efficiently using a solution containing about 0.5% to about 20% by weight of the silicate salt. Ordinarily, however, compositions having superior physical properties and characteristics are produced when the concentration of the silicate salt solution is maintained below about 15% by weight of solids. In the preferred embodiment of the invention, the aqueous silicate salt solution which is employed has a concentration of from about 5% to about 10%, by weight, of solids.

The salt of the partial amide is mixed with the dispersion or solution of the silicate salt in the process of this invention. This step is accomplished with continuous stirring. Generally, the partial amide salt is added to the silicate salt solution and, ordinarily, it is added thereto in the form of a solution or dispersion. However, the sequence in which the materials are mixed is of no significance whatsoever to the operability of the invention, and hence, if desired the silicate salt dispersion or solution could be added to the amide salt. Furthermore, if the particular partial amide salt to be used is liquid at room temperature or at a temperature at or below that at which the reaction is to be carried out, the liquid amide salt can be added, as is, to the aqueous silicate salt solution. In the preferred embodiment of the invention the partial amide salt is melted if it is a solid product, dissolved or dispersed in a solvent, preferably water, and thereafter added to the silicate salt solution. In addition to water, however, any organic solvent in which the particular partial amide salt is at least dispersible can be used in this step of the process.

The silicate salt and the partial amide salt will react to form the siliceous amino compounds of this invention at atmospheric pressure and at temperatures ranging from about room temperature to about 90° C. In certain instances, temperatures even higher than 90° C. can be employed. However, the reaction temperature should never be permitted to exceed the boiling point of any of the materials present in the reaction mixture nor the decomposition temperature of any of the reactants. In the preferred practice of the invention the reaction between the silicate salt and the salt of the partial amide is carried out at atmospheric pressure and at a temperature ranging from about 40° C. to about 80° C.

Generally, the reaction by which the novel products of this invention are produced can be completed within a relatively short period of time. However, the actual time consumed in the preparation of any particular product will depend to a large extent upon the reaction temperature employed and upon the efficiency of the mixing operation. When the reaction is complete and the desired siliceous amino compound has been obtained, if originally no excess silicate salt was used, or if an excess was used and it is desired to remove it from the product of the invention, the dispersed siliceous amino compound is separated, as, for example by filtration, from the solvent, or mixture thereof, in which it was produced. The siliceous amino compound can then be liberated readily from any residual silicate salt present by washing it thoroughly in water. If, however, excess silicate salt was employed and it is desired to convert it to silicon dioxide, an acid of the type described heretofore is added to the reaction mixture with stirring. In general, this can be done at any temperature between room temperature and 90° C. Preferably, the acid is added to the reaction mixture at a temperature within the range of from about 70° C. to about 80° C. The reaction mixture is continuously stirred until all of the unreacted silicate salt present has been converted into silicon dioxide. Thereafter, the dispersed product is separated from the reaction media in which it was produced, for example, by filtration, and subsequently washed several times with water. The product is, after being washed with water, dried and reduced to a powdery form by milling, grinding or other appropriate means. For the most part, all of the products of this invention are powdery white materials which are substantially insoluble in water. In most instances the products have melting points above about 300° C.

The novel products of the invention are especially suited for use in the production of general purpose lubricating greases. They can be used with any of the lubricating oils normally used in the production of greases. Thus, if desired, paraffin base, naphthenic base or asphaltic base oils can be employed in preparing greases from the products of this invention. For the most part, greases made from these products have superior chemical and thermal stability. Furthermore, the drop points of these greases exceed about 500° F. Moreover, greases made from these products do not disintegrate or break down in the presence of water or water vapor and they tend to inhibit the corrosion of ferrous metals in the presence of water. In addition to the above highly outstanding properties, the products of this invention form mechanically stable greases in oil at ordinary room temperatures. Greases made from these products are further distinguished by a particularly unique property which will suggest, to those skilled in the art, uses to which the products may be applied. It has been found that, unlike conventional greases, greases made from the products of this invention have lower penetration values at elevated temperatures than they do at room temperature.

In general, greases completely satisfactory in every regard can be produced using from about 15% to about 40% by weight, and preferably 17.5% to 25% by weight, of the products of this invention. However, the invention should not be construed as limited solely to such greases. Since the gelling properties of the various products do vary to some extent it is to be expected that certain of these products will produce greases suitable for particular uses when employed in quantities which are not within the prescribed range. Thus, for example, lesser quantities of products having a high silicon dioxide content are normally required to produce satisfactory greases than are required in the production of greases using products having a lower silicon dioxide content.

Although the products of this invention are designed primarily for use in the production of general purpose lubricating greases, the products are suitable for other uses. For example, the particle size of these products renders them particularly useful as flatting agents. However, the characteristics and properties of the products will immediately suggest to those skilled in the art other uses to which the products may be adapted.

For a fuller understanding of the nature and objects of the invention reference may be had to the following examples which are given merely as further illustrations of the invention and are not to be construed in a limiting sense.

*Example I*

In this example, 250.0 grams of sodium silicate (40° Bé. solution of $Na_2O:3.22SiO_2$) were dissolved in 1590 cc. of water. The solution was heated to and maintained at a temperature of from about 70° C. to about 80° C. One hundred grams of a monoamide, prepared by reacting equimolar quantities of hydrogenated tallow fatty acids and tetraethylene pentamine, were heated to a temperature of from about 80° C. to about 90° C. At this temperature, the monoamide was in a molten state. The melted amide was then dispersed in 957 cc. of water which had been pre-heated to a temperature of from about 70° C. to about 80° C. To the dispersion, 42.8 grams of glacial acetic acid (99%) were added to produce the acetate salt of the monoamide. The dispersion thus obtained was clear, stable and transparent at a temperature of from about 70° C. to about 80° C.

The solution of the acetate salt of the monoamide was, thereafter, added slowly to the sodium silicate solution, the temperature of both solutions being from about 70° C. to about 80° C. During the addition of the monoamide salt to the silicate salt solution, the mixture was continuously stirred. In this example, the quantity of sodium silicate employed was stoichiometrically equivalent to the quantity of amide salt used. A yellowish, creamy dispersion of the siliceous amino compound formed almost immediately. The reaction mixture was stirred for an hour at a temperature of from about 70° C. to about 80° C.

Thereafter, the dispersion was filtered to remove the siliceous amino compound from the aqueous media in which it was produced. The product was subsequently washed four times, each time using about one liter of water heated to a temperature of from about 45° C. to about 50° C. The siliceous amino compound was then dried in an oven at a temperature of from about 150° F. to about 155° F. and, thereafter, ground through a laboratory mill of the rotating hammer type. A white powdery material which was unctuous in texture was obtained. The product was recovered in a yield of 170 grams and the particles of said product were found to be less than 0.5 micron in diameter.

The gel-forming characteristics of the above product were evaluated by the following procedure:

Twenty-five grams of Carnea Oil 33 (300 S.U.S., naphthenic base oil) a product of the Shell Oil Company, New York, New York, were placed in a 150 ml. beaker. This oil was then agitated at 700 r.p.m. with a gate-type, single stirrer agitator, the solution at all times being kept at or about room temperature. The product of the example was sprinkled slowly into the stirring oil. The quantity of amino compound required to thicken the oil to a point where the oil would not flow or drop from a vertically held spatula was observed and recorded as the initial gel point. Thereafter, additional quantities of the product were added to the oil until a soft solid grease was formed which resisted flow when agitated. The total quantity of siliceous amino compound required to reach this stage was observed and recorded as the final gel point. These gel points were reported in terms of the percentage, by weight, of the product in relation to the total weight of the gel which was required to reach either the initial or final gel point. Using the product of this example the initial gel point was reached at about 31.5%, by weight, of solids. At the final gel point, the grease produced contained a total of about 34.4% by weight of solids. Aluminum stearate subjected to this test under identical conditions, did not form a mechanically stable gel in said oil.

*Example II*

In this example, 250 grams of sodium silicate

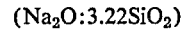

were dissolved in 1590 cc. of water at a temperature of from about 70° C. to about 80° C. Thereafter, 30.0 grams of a monoamide, produced by the reaction of tetraethylene pentamine and hydrogenated tallow fatty acids, were dispersed in 551.7 cc. of water, also at a temperature of from about 70° C. to about 80° C. To this heated dispersion of monoamide, 18.3 grams of glacial acetic acid (70%) were added to produce the acetate salt of the monoamide.

The aqueous dispersion of the monoamide salt was subsequently added slowly to the aqueous solution of sodium silicate. Both the solution and the dispersion were at temperatures within the range of from about 70° C. to about 80° C. prior to admixing them. The quantity of sodium silicate employed in this example was in excess of the quantity theoretically required to react with all of the monoamide salt present. A dispersion of the siliceous amino compound commenced forming immediately. The reaction mixture was stirred continuously for about thirty minutes at a temperature within the range of from about 70° C. to about 80° C. At the end of that period of time, 45.7 grams of hydrochloric acid (35%) were added, drop by drop, with stirring to the dispersion of the aqueous siliceous amino compound. The reaction mixture was stirred at a temperature of from about 70° C. to about 80° C. for about thirty minutes after the addition of the acid was completed. Thereafter, the product was separated from the aqueous solution in which it was prepared by filtration and subsequently washed with water, dried and ground in the manner described in Example I.

A white unctuous powder, the particles of which had diameters which were less than 0.5 micron, was obtained. The initial gel point and the final gel point were determined in the manner described in Example I. The initial and final gel points were found to be at 16.6% and 19.3%, by weight, respectively of the product.

A grease was prepared from this product and, subsequently, evaluated. In preparing this grease 23.0 parts by weight of the product were dispersed in 77.0 parts of Carnea Oil 33. The dispersion was stirred at room temperature until the powdery product was evenly distributed throughout the oil. Thereafter, the liquid dispersion was passed through a Premier Laboratory Colloid Mill (type UB6, manufactured by the Premier Mill Corporation, Geneva, New York). The rotor and stator surfaces of the mill were adjusted to provide a clearance of 0.002 inch. A grease of heavy consistency was obtained. The grease was tested by the Tentative Method of Test For Cone Penetration of Lubricating Grease, A.S.T.M. designation D217–52T. The unworked penetration of the grease was 275 at 90° C. and 316 at 30° C. The worked penetration (1000 strokes) of the grease was 285 at room temperature.

This grease was unique in that its unworked penetration was lower at an elevated temperature than it was at about room temperature. This property will suggest uses for which the product may be suitable.

Another grease was produced in the same manner as above, except that the clearance between the rotating and stationary surfaces of the mill was adjusted to 0.015 inch. This grease had an unworked penetration, at 38° C., of 255 and a worked penetration, both 60 strokes and 1000 strokes, of 252 at room temperature.

The greases prepared using this product were tacky and cohesive and they adhered well to metal. They did not bleed at temperatures of 150° F. or 220° F. The greases had drop points which were higher than 500° F. They did not disintegrate in the presence of water and they exhibited outstanding thermal stability. Furthermore, these greases tended to inhibit the corrosion of ferrous metals.

*Example III*

In this example, 250 grams of sodium silicate

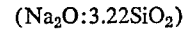

were dispersed in 1750 cc. of water heated to a temperature of from about 70° C. to about 80° C. Fifty grams of an acetic acid salt of a diamide, produced by the reaction of behenic acid with diethylene triamine, were dispersed in 950 cc. of water at a temperature of from about 70° C. to about 80° C. Thereafter, at a temperature of from about 70° C. to about 80° C., the sodium silicate solution and the dispersion of the diamide salt were admixed with continuous stirring. The quantity of sodium silicate employed was in excess of the quantity theoretically required to react with all of the amide salt used. The reaction was allowed to proceed for a period of about thirty minutes. Then 56.0 grams of hydrochloric acid (37.5%) were added drop by drop to the heated reaction mixture with stirring. The mixture was stirred for thirty minutes after all of the hydrochloric acid had been added. At the end of this time, the product was removed by filtration from the aqueous solution in which it was prepared. The product was then washed, dried and ground in the manner described in Example I.

The product of this example was a white, powdery material which was unctuous in texture. The initial and final gel points of the product of this example, as determined by the method described in Example I, were found to be at 40.4% and 43.2% by weight, respectively.

*Example IV*

89.6 grams of sodium silicate ($Na_2O:3.22SiO_2$) were dissolved in 572 cc. of water at a temperature of from about 70° C. to about 80° C. One hundred grams of a diamide, produced by the reaction of hydrogenated tallow fatty acids with diethylene triamine, were reacted with 15.5 grams of glacial acetic acid to produce the acetate salt of said diamide following which the salt was dispersed in 1885 cc. of water at a temperature of from about 70° C. to about 80° C. Thereafter the aqueous sodium silicate solution, the quantity of said sodium silicate being stoichiometrically equivalent to the quantity of diamide salt present, and the aqueous diamide salt dispersion were admixed at a temperature of from about 70° C. to 80° C. During the mixing of the ingredients and for a period of about sixty minutes thereafter the reaction mixture was continuously stirred. At the end of this time the product was separated from the aqueous solution by filtration and then washed, dried and ground in the manner described in Example I.

The product of this example was a white powdery material which was unctuous in texture. In accordance with the procedure outlined in Example I, it was determined that the initial gel point was at 26.5%, by weight, of the product of this example and that the final gel point was at 28.6% by weight, of the product of the example.

*Example V*

A solution comprising 28.9 grams of sodium silicate ($Na_2O:3.22SiO_2$) and 185 cc. of water was prepared at a temperature of from about 70° C. to about 80° C. A dispersion comprising 100.0 grams of a triamide, produced by the reaction of hydrogenated tallow fatty acids with triethylene tetramine, and 1995 cc. of water was prepared at a temperature of from about 70° C. to about 80° C. To this latter dispersion 5.0 grams of glacial acetic acid (99.9%) were added to produce the acetate salt of the triamide. Thereafter the aqueous sodium silicate solution and the aqueous triamide salt dispersion were admixed at a temperature ranging from about 70° C. to about 80° C. with constant stirring. The quantity of sodium silicate employed was that theoretically required to react with all of the triamide salt used. The reaction was allowed to proceed for a period of about one hour. At the end of this time the dispersed siliceous amino compound was removed from the aqueous solution in which it was prepared by filtration and subsequently washed with water and dried and ground in the manner described in Example I.

The product was a powdery, white composition which was unctuous in texture. In the gel point determination conducted in the manner described in Example I, it was found that both the initial and final gel points were reached at 44.4%, by weight, of the product of this example.

*Example VI*

In this example, 394.0 grams of sodium silicate ($Na_2O:3.22SiO_2$) were dissolved in 2520 cc. of water at a temperature of from about 70° C. to about 80° C. A dispersion of 47.4 grams of a monoamide, produced by the reaction of 12-hydroxy-stearic acid with diethylene triamine, and 887 cc. of water was thereafter prepared at a temperature of from about 70° C. to about 80° C. To this latter dispersion, 15.0 grams of glacial acetic acid (99.9%) were added to produce the acetate salt of the monoamide. Subsequently, the aqueous solution of sodium silicate, the quantity thereof being in excess of that theoretically required, and the aqueous dispersion of the acetate salt of the monoamide were admixed and continuously stirred at a temperature of from about 70° C. to about 80° C. for a period of about thirty minutes. At the end of this time, 88.0 grams of hydrochloric acid (37.2%) were added drop by drop with stirring to the reaction mixture. The reactants were continuously stirred for a period of about thirty minutes at a temperature of from about 70° C. to about 80° C. Thereafter, the product was separated from the aqueous media by filtration and washed in water, dried and ground in the manner described in Example I.

The product obtained was a white unctuous powder. The initial and final gel points were determined by the procedure described in Example I. It was found that the initial gel point was reached at 19.3% by weight and the final gel point at 20.6% by weight of the product of the example.

*Example VII*

A solution comprising 381.25 grams of sodium silicate ($Na_2O:3.22SiO_2$) and 2400 cc. of water was prepared at a temperature of about 70° C. to about 80° C. A dispersion comprising 18.75 grams of a monoamide, produced by the reaction of caproic acid with diethylene triamine, and 345 cc. of water was similarly produced. To this latter dispersion, 10.87 grams glacial acetic acid (99.9%) were added to produce the acetic acid salt of the monoamide. The aqueous sodium silicate solution, the sodium silicate being used in an excess quantity, and the aqueous dispersion of the amide salt were admixed with constant stirring at a temperature of from about 70° to about 80° C. The reaction was allowed to proceed for a period of about thirty minutes following which 88.4 grams of hydrochloric acid (37.5%) were added drop by drop thereto. The reaction mixture was continuously stirred at a temperature of about 70° C. to about 80° C. for a period of thirty minutes after all of the hydrochloric acid had been added. Thereafter, the product was separated from the aqueous reaction medium by filtration and washed with water, dried and ground in the manner described in Example I. The final product of this example was a white powder which was unctuous in texture. By the method described in Example I, it was determined that the initial gel point, using the product of this example, was at 28.6% by weight and that the final gel point was at 30.5% by weight.

*Example VIII*

In this example, 305.0 grams sodium silicate ($Na_2O:3.22SiO_2$) were dissolved in 2150 cc. of water. Fifteen grams of the monoamide produced by the reaction of diethylene triamine and Neo Fat 12, a proprietary lauric acid produced by Armour and Co., Chicago, Illinois, were thereafter dispersed in 280 cc. of water. Both the solution and the dispersion were prepared at temperatures of from about 70° to about 80° C. To the aqueous dispersion of the monoamide salt, 6.7 grams glacial acetic acid (99.9%) were added to produce the acetic salt of the monoamide. Subsequently, the aqueous sodium silicate solution, the quantity of said sodium silicate being in excess of that theoretically required, and the aqueous dispersion of the monoamide salt were admixed at a temperature of from about 70° to about 80° C. The reactants were mixed at that temperature for about thirty minutes. Thereafter, 73.9 grams of hydrochloric acid (37.5%) were added to the mixture, drop by drop, with stirring. Stirring was continued for about thirty minutes, following which the product was separated from the aqueous reaction medium by filtration, washed with water, dried and ground in the manner described in Example I.

The product was a white unctuous powder. By the method described in Example I, it was determined that the initial and final gel points were reached when 12.4% and 13.7% by weight, respectively, of this product were added to the oil.

A grease was thereafter produced as follows. Ninety grams of the product were homogeneously admixed at room temperature with 510 grams of Shell Carnea Oil 33. The mixture was then passed twice through a Premier Laboratory Colloid Mill (type UB6), the surfaces of which were adjusted to provide a clearance of 0.002 inch. A soft, slightly hazy, semi-transparent grease was obtained.

The penetration of this grease was determined at room temperature in accordance with A.S.T.M. designation D217–52T. The unworked penetration of the grease was 348. The worked (1000 strokes) penetration of the grease was 355.

This grease had a drop point of in excess of 500° F. It did not bleed at room temperature or at 220° F.

*Example IX*

In this example, 394.0 grams of sodium silicate ($Na_2O:3.22SiO_2$) were dissolved in 2546 cc. of water at a temperature of about 70° C. to about 80° C. Thereafter, 27.6 grams of a monoamide, produced by the reaction of hydrogenated tallow fatty acids with diethylene triamine, were dispersed in 514 cc. of water at a temperature of about 70° C. to about 80° C. The latter dispersion was treated with 10.5 grams of glacial acetic acid (99.9%) to produce the acetate salt of the monoamide. Subsequently, the sodium silicate solution and the acetate salt solution were admixed at a temperature of from about 70° C. to about 80° C. The quantity of sodium silicate employed was in excess of the quantity theoretically required to react with the amide salt present. The materials were continuously stirred for a period of about thirty minutes. Then, 43.1 grams of hydrochloric acid (37.2%) were added drop by drop with stirring to the heated reaction mixture. After a period of about thirty minutes the aqueous dispersion was filtered and the product obtained was washed, dried and ground in the manner described in Example I.

The product of this example was a fine white powdery material. As determined by the method described in Example I, the initial and final gel points were at 10.3% by weight and 12.3% by weight of solids, respectively.

A grease was produced using the product of this example in the following manner. Sixty grams of the product were added to 282.0 grams of Carnea Oil 33. The mixture was stirred at room temperature until a homogeneous dispersion was obtained. Thereafter, the dispersion was passed through a Morehouse Mill, Model A-200, manufactured by Morehouse Industries, Los Angeles, Calif. The mill was adjusted to a clearance of about 0.002 inch. The grease thus obtained, when tested at room temperature in accordance with the test method described in A.S.T.M. designation D217-52, had an unworked penetration of 330 and a work penetration (1000 strokes) of 338.

This grease did not bleed at temperatures of 80° F. or 220° F. and it had a drop point which was in excess of 500° F.

*Example X*

In this example, 250 grams of sodium silicate ($Na_2O:3.22SiO_2$)

were dissolved in 1750 grams of water at a temperature of from about 70° C. to about 80° C. Forty grams of the acetate salt of a monoamide, produced by the reaction of cottonseed oil with diethylene triamine, were then dispersed in 360 grams water at a temperature of from about 70° C. The sodium silicate solution and the aqueous amide salt dispersion were admixed at a temperature of from about 70° C. to about 80° C. The quantity of sodium silicate employed was in excess of that required to react with the quantity of monoamide salt used. The mixture was continuously stirred for a period of about thirty minutes following which 48.0 grams of hydrochloric acid (37.5%) were added thereto. Heating and stirring were continued for an additional thirty minutes. At the end of that time, the aqueous dispersion was filtered and the product obtained was washed with water, dried and ground in the manner described in Example I.

The product of this example was a fine, white powdery material. The product was subjected to the gelling point test described in Example I. It was found that using the product of this example the initial gel point was reached at 39.0%, by weight, of solids and that the final gel point was reached at 41.9% by weight of solids.

*Example XI*

In this example, 99.3 grams of Kasil SS, a potassium silicate ($K_2O:3.91SiO_2$) obtained from the Philadelphia Quartz Co., Philadelphia, Pa., were dissolved in 1900 cc. of water at a temperature of 85° C. to 95° C. Thirty grams of a monoamide of dichlorostearic acid and diethylene triamine dissolved in 560.0 cc. of xylene were thereafter reacted with 5.8 grams of phosphoric acid (85% $H_3PO_4$) at a temperature of from about 75° C. to about 80° C. to produce the phosphoric acid salt of the monoamide.

Thereafter, at a temperature within the range of from about 70° C. to about 80° C., the xylene solution of the monoamide phosphate was slowly poured in a steady stream into the Kasil SS solution which solution during the addition was being continuously agitated at from about 400 to 500 r.p.m. The quantity of Kasil SS present was in excess of the quantity theoretically required to react with all of the monoamide salt employed. Mixing at a temperature of from about 70° C. to 75° C. was allowed to continue for a period of about thirty minutes after all of the monoamide phosphate was added. At the end of the thirty minute period a solution of 23.6 grams phosphoric acid (85% $H_3PO_4$) and 110 cc. of water was added to the dispersion in a dropwise stream with stirring at a temperature of from about 70° C. to about 75° C. The ensuing dispersion was stirred for an additional thirty minutes. At the end of that time, the dispersion of small brown colored spheres obtained was filtered and the product obtained was washed with water and dried in the manner described in Example I.

The product of this example was obtained in the form of small, brown-colored spheres which crushed very readily to a fine powder. By the method described in Example I it was determined that the initial gel point was reached when 26.4% by weight of the product of this example was employed and that the final gel point was reached when 28.6% by weight of the product was employed.

*Example XII*

In this example, 375.0 grams sodium silicate (40° Bé. solution of $Na_2O:3.22SiO_2$) were dissolved in 2400 cc. of water. The solution was heated and maintained at a temperature of from about 70° C. to about 80° C. Forty-five grams of a monoamide produced by the reaction of equimolar quantities of oleic acid and 3-dimethyl amino propylamine was reacted with 8.1 grams of glacial acetic acid. The acetate salt thus produced was dissolved in 850 cc. of water at a temperature of from about 80° to about 85° C. A clear amber colored solution resulted. The acetate solution of the monoamide salt was poured, in a slow steady stream, into the aqueous solution of the sodium silicate. During the addition of the acetate salt, the aqueous sodium silicate solution, heated to a temperature of from 70° to 75° C., was being rapidly agitated. The quantity of sodium silicate employed was in excess of that required to react with the monoamide present. The dispersion was mixed at a temperature of from about 70° to about 75° C. for a period of about 30 minutes following which 34.2 grams of hydrochloric acid (37.0%) diluted with 92.4 cc. of water was added, drop by drop, thereto. The mass was thereafter agitated for a period of 30 minutes at a temperature of from about 70° to about 75° C.

The product was filtered, washed with water and dried and its initial and final gelling points determined by the method prescribed in Example I. Using the product of this example, it was found that the initial gelling point was reached when 34.2% by weight of the product of this example was added to the oil. The final gelling point was reached when 35.8% by weight of this product was added to the oil.

Example XIII

In this example, 375.0 grams of sodium silicate (40° Bé. solution of $Na_2O:3.22SiO_2$) were dissolved in 2400 cc. of water. This solution was heated to a temperature of from about 70° to about 75° C. Thereafter, 45.0 grams of a monoamide produced by the reaction of equimolecular proportions of diethylene triamine and naphthenic acid were dispersed with agitation in 850 cc. of water. The monoamide in aqueous solution was subsequently treated with 17.6 grams of glacial acetic acid (99%) to produce the acetate salt thereof. This dispersion was heated to a temperature of from about 70° to about 75° C. Thereafter, the acetate salt dispersion was poured in a slow steady stream into the sodium silicate solution while agitating the solution. The dispersion which resulted was agitated at a temperature of from about 70° to about 75° C. for a period of about thirty minutes. At the end of this time, 74.0 grams of hydrochloric acid (37.1%), diluted with 74 cc. of water, was poured drop by drop into the aqueous dispersion. The dispersion was then agitated at a temperature of from about 70° to about 75° C. for a period of about thirty minutes. Thereafter, the dispersion was filtered, washed with water and dried to a moisture content of about 0.4% in the manner described in Example I. The product of this example was obtained in the form of a white powder which was unctuous in texture.

The initial and final gelling points of the product of this example were determined by the method described in Example I. It was found that the initial gelling point was reached when 28.6% by weight of this product had been added to the oil. The final gelling point was reached when 30.4% by weight of the product had been added to the oil.

Having described my invention, what I claim as new and desire to secure by Letters Patent is:

1. A siliceous amino compound produced by reacting (a) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to about 21 carbon atoms, glycerides, naphthenic acid and tall oil, and (b) an approximately stoichiometrically equivalent quantity of a silicate salt selected from the group consisting of sodium silicates, potassium silicates and ammonium silicates sufficient to neutralize all of the acid radicals of said salt of a partial amide.

2. The compound of claim 1 wherein the partial amide is prepared by reacting an alkylene polyamine with an aliphatic monocarboxylic acid containing the radical RCO—, said R representing a carbon chain length of from about 5 to about 21 carbon atoms.

3. The compound of claim 1 wherein the partial amide is prepared by reacting an alkylene polyamine with an ester of said aliphatic monocarboxylic acid, said ester containing the radical RCO—, said R representing a carbon chain length of from about 5 to about 21 carbon atoms.

4. The compound of claim 1 wherein the partial amide is prepared by reacting an alkylene polyamine with an acyl halide of said aliphatic monocarboxylic acid, said acyl halide containing the radical RCO—, said R representing a carbon chain length of from about 5 to about 21 carbon atoms.

5. The compound of claim 1 wherein the partial amide is prepared by reacting an alkylene polyamine with naphthenic acid.

6. The compound of claim 1 wherein the partial amide is prepared by reacting an alkylene polyamine with tall oil.

7. A siliceous amino compound produced by (1) reacting (a) a salt of a partial amide, said salt being selected from the group consisting of water-soluble and water-dispersible salts of partial amides and said partial amide being prepared by reacting an alkylene polyamide with a material selected from the group consisting of aliphatic monocarboxylic acids, their esters and their acyl halides containing the radical RCO—, said R representing a carbon chain length of from about 5 to about 21 carbon atoms, glycerides, naphthenic acid and tall oil and (b) a silicate salt selected from the group consisting of sodium silicates, potassium silicates and ammonium silicates, the quantity of said silicate salt being sufficient to neutralize all of the acid radicals of said partial amide salt and to provide for an excess of silicate salt which when reacted with acid will form silicon dioxide in an amount up to about 90% by weight of the final product, and subsequently (2) adding to the product obtained by reacting (a) and (b), a quantity of acid approximately stoichiometrically equivalent to the unreacted silicate salt present, said acid being selected from the group consisting of aliphatic monocarboxylic acids having a carbon chain length of up to about 6 carbon atoms, hydrochloric acid, phosphoric acid and sulfuric acid.

8. The compound of claim 7 wherein the partial amide is prepared by reacting an alkylene polyamine with an aliphatic monocarboxylic acid containing the radical RCO—, said R representing a carbon chain length from about 5 to about 21 carbon atoms.

9. The compound of claim 7 wherein the partial amide is prepared by reacting an alkylene polyamine with an ester of said aliphatic monocarboxylic acid, said ester containing the radical RCO—, said R representing a carbon chain length of from about 5 to about 21 carbon atoms.

10. The compound of claim 7 wherein the partial amide is prepared by reacting an alkylene polyamine with an acyl halide of said aliphatic monocarboxylic acid, said acyl halide containing the radical RCO—, said R representing a carbon chain length of from about 5 to about 21 carbon atoms.

11. The compound of claim 7 wherein the partial amide is prepared by reacting an alkylene polyamine with naphthenic acid.

12. The compound of claim 7 wherein the partial amide is prepared by reacting an alkylene polyamine with tall oil.

13. The compound of claim 7 wherein the partial amide salt is the acetic acid salt of the monoamide of tetraethylene pentamine and hydrogenated tallow fatty acids and the silicate salt is sodium silicate.

14. The compound of claim 7 wherein the partial amide salt is the phosphoric acid salt of the monoamide of diethylene triamine and dichlorostearic acid, the silicate salt is potassium silicate and the acid employed in step (2) is phosphoric acid.

15. The compound of claim 7 wherein the partial amide salt is the acetic acid salt of monoamide of tetraethylene pentamine and hydrogenated tallow fatty acids, the silicate salt is sodium silicate and the acid employed in step (2) is hydrochloric acid.

16. The compound of claim 7 wherein the partial amide salt is the acetic acid salt of the monoamide of diethylene triamine and hydrogenated tallow fatty acids, the silicate salt is sodium silicate and the acid employed in step (2) is hydrochloric acid.

17. The compound of claim 7 wherein the partial amide salt is the acetic acid salt of the monoamide of diethylene triamine and 12-hydroxy stearic acid, the silicate salt is sodium silicate and the acid employed in step (2) is hydrochloric acid.

18. A mineral lubricating grease consisting essentially of a lubricating oil and from about 15% to about 40% by weight of a compound produced by reacting (a) a salt of a partial amide, said salt being selected from the group consisting of water-soluble and water-dispersible salts of partial amides and said partial amide being prepared by reacting an alkylene polyamine with a material selected from the group consisting of aliphatic monocarboxylic acids, their esters and acyl halides containing the radical RCO—, said R representing a carbon chain length of from about 5 to about 21 carbon atoms, glycerides, naphthenic acid and tall oil, and (b) an approximately stoichiometrically equivalent quantity of a silicate salt selected from the group consisting of sodium silicates, potassium silicates and ammonium silicates sufficient to neutralize all of the acid radicals of said salt of a partial amide.

19. A mineral lubricating grease consisting essentially of a lubricating oil and from about 15% to about 40% by weight of a compound produced (1) by reacting (a) a salt of a partial amide, said salt being selected from the group consisting of water-soluble and water-dispersible salts of partial amides and said partial amide being prepared by reacting an alkylene polyamine with a material selected from the group consisting of aliphatic monocarboxylic acids, their esters and their acyl halides containing the radical RCO—, said R representing a carbon chain length of about 5 to about 21 carbon atoms, glycerides, naphthenic acid and tall oil and (b) a silicate salt selected from the group consisting of sodium silicates, potassium silicates and ammonium silicates, the quantity of said silicate salt being sufficient to neutralize all of the acid radicals of said partial amide salt and to provide for an excess of silicate salt which when reacted with acid will form silicon dioxide in an amount up to about 90% by weight of the final product, and subsequently (2) adding to the product obtained by reacting (a) and (b) a quantity of acid approximately stoichiometrically equivalent to the unreacted silicate salt present, said acid being selected from the group consisting of aliphatic monocarboxylic acids having a carbon chain length of up to about 6 carbon atoms, hydrochloric acid, phosphoric acid and sulfuric acid.

20. The composition of claim 19 wherein the partial amide is prepared by reacting an alkylene polyamine with an aliphatic monocarboxylic acid containing the radical RCO—, said R representing a carbon chain length of from about 5 to about 21 carbon atoms.

21. The composition of claim 19 wherein the partial amide is prepared by reacting an alkylene polyamine with an ester of said aliphatic monocarboxylic acid, said ester containing the radical RCO—, said R representing a carbon chain length of from about 5 to about 21 carbon atoms.

22. The composition of claim 19 wherein the partial amide is prepared by reacting an alkylene polyamine with an acyl halide of said aliphatic monocarboxylic acid, said acyl halide containing the radical RCO—, said R representing a carbon chain length of from about 5 to about 21 carbon atoms.

23. The composition of claim 19 wherein the partial amide employed is prepared by reacting an alkylene polyamine with naphthenic acid.

24. The composition of claim 19 wherein the partial amide employed is prepared by reacting an alkylene polyamine with tall oil.

25. The composition of claim 19 wherein the partial amide salt employed is the acetic acid salt of the monoamide of tetraethylene pentamine and hydrogenated tallow fatty acids, the silicate salt is sodium silicate and the acid used in step (2) is hydrochloric acid.

26. The composition of claim 19 wherein the partial amide salt employed is the acetic acid salt of the monoamide of diethylene triamine and lauric acid, the silicate salt is sodium silicate and the acid used in step (2) is hydrochloric acid.

27. The composition of claim 19 wherein the partial amide salt employed is the acetic acid salt of the monoamide of diethylene triamine and hydrogenated tallow fatty acids, the silicate salt is sodium silicate and the acid used in step (2) is hydrochloric acid.

28. A process for preparing a siliceous amino compound which comprises reacting (a) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from 5 to about 21 carbon atoms, glycerides, naphthenic acid and tall oil, and (b) an approximately stoichiometrically equivalent quantity of a silicate salt selected from the group consisting of sodium silicates, potassium silicates and ammonium silicates sufficient to neutralize all of the acid radicals of said salt of a partial amide.

29. A process for preparing a siliceous amino compound by (1) reacting (a) a salt of a partial amide, said salt being selected from the group consisting of water-soluble and water dispersible salts of partial amides and said partial amide being prepared by reacting an alkylene polyamine with a material selected from the group consisting of aliphatic monocarboxylic acids, their esters and their acyl halides containing the radical RCO—, said R representing a carbon chain length of from 5 to about 21 carbon atoms, glycerides, naphthenic acid and tall oil and (b) a silicate salt selected from the group consisting of sodium silicates, potassium silicates and ammonium silicates, the quantity of said silicate salt being sufficient to neutralize all of the acid radicals of said partial amide salt and to provide for an excess of silicate salt which when reacted with acid will form silicon dioxide in an amount up to about 90% by weight of the final product, and subsequently (2) adding to the product obtained by reacting (a) and (b), a quantity of acid approximately stoichiometrically equivalent to the unreacted silicate salt present, said acid being selected from the group consisting of aliphatic monocarboxylic acids having a carbon chain length of up to about 6 carbon atoms, hydrochloric acid, phosphoric acid and sulfuric acid.

30. The process of claim 28 in which said partial amide salt is the acetic acid salt of the monoamide of tetraethylene pentamine and hydrogenated tallow fatty acids and the silicate salt is sodium silicate.

31. The process of claim 29 in which said partial amide salt is the acetic acid salt of the monoamide of tetraethylene pentamine and hydrogenated tallow fatty acids and the silicate salt is sodium silicate.

References Cited in the file of this patent

UNITED STATES PATENTS

| | | |
|---|---|---|
| 2,623,852 | Peterson | Dec. 30, 1952 |
| 2,623,853 | Stross | Dec. 30, 1952 |
| 2,629,691 | Peterson | Feb. 24, 1953 |
| 2,648,633 | Peterson | Aug. 11, 1953 |
| 2,652,361 | Wood et al. | Sept. 15, 1953 |
| 2,658,869 | Stross et al. | Nov. 10, 1953 |
| 2,681,314 | Skinner et al. | June 15, 1954 |
| 2,748,081 | Peterson | May 29, 1956 |